United States Patent [19]

Bugler, III

[11] Patent Number: 5,227,096
[45] Date of Patent: Jul. 13, 1993

[54] CIRCULAR REHABILITATED INDUSTRIAL CROSSFLOW WATER COOLING TOWER AND METHOD OF REHABILITATION THEREOF

[75] Inventor: Thomas W. Bugler, III, Prairie Village, Kans.

[73] Assignee: The Marley Cooling Tower Company, Mission, Kans.

[21] Appl. No.: 936,859

[22] Filed: Aug. 27, 1992

[51] Int. Cl.⁵ .............................................. B01F 3/04
[52] U.S. Cl. ........................... 261/109; 261/DIG. 11; 261/111
[58] Field of Search ............... 261/108, 109, 110, 111, 261/DIG. 11

[56] References Cited

U.S. PATENT DOCUMENTS

| | | | |
|---|---|---|---|
| 3,243,166 | 3/1966 | Osenga et al. | 261/109 |
| 3,322,409 | 5/1967 | Reed | 261/111 |
| 3,743,257 | 7/1973 | Fordyce | 261/DIG. 11 |
| 3,834,681 | 9/1974 | Fordyce et al. | |
| 4,048,265 | 9/1977 | Fordyce et al. | |
| 4,129,625 | 12/1978 | Fordyce et al. | 261/111 |
| 4,299,785 | 11/1981 | Fougea | 261/111 |
| 4,663,092 | 5/1987 | Kinney, Jr. et al. | |
| 4,706,554 | 11/1987 | Baldino et al. | 261/DIG. 11 |
| 5,112,537 | 5/1992 | Kinney, Jr. et al. | |

OTHER PUBLICATIONS

Burger, Cooling Tower Rebuilding, Report for Cooling Tower Institute Annual Meeting 1-28 to 30-1975, Robert Burger Associates, New York, N.Y.

*Primary Examiner*—Tim Miles
*Attorney, Agent, or Firm*—Hovey, Williams, Timmons & Collins

[57] ABSTRACT

A method of rehabilitating existing circular, industrial-size crossflow water cooling towers is provided wherein a new fill ring is built by sequentially constructing segments of the new ring around the old ring until the full circumference thereof has been encased. The individual structural segments are added to the existing fill ring without the necessity of deactivating the tower or significantly decreasing its performance output. New ring segments may be sequentially constructed next adjacent a previously initiated fill supporting structure well before completion of the latter. As soon as each new fill supporting structure is completed to a point that new fill components may be incorporated therein, hot water from the existing distribution basin may be directed to the new fill section, and the old fill removed. Addition of the fill ring around the existing fill ring increases the capacity of the tower at a cost substantially less than constructing a new tower.

16 Claims, 6 Drawing Sheets

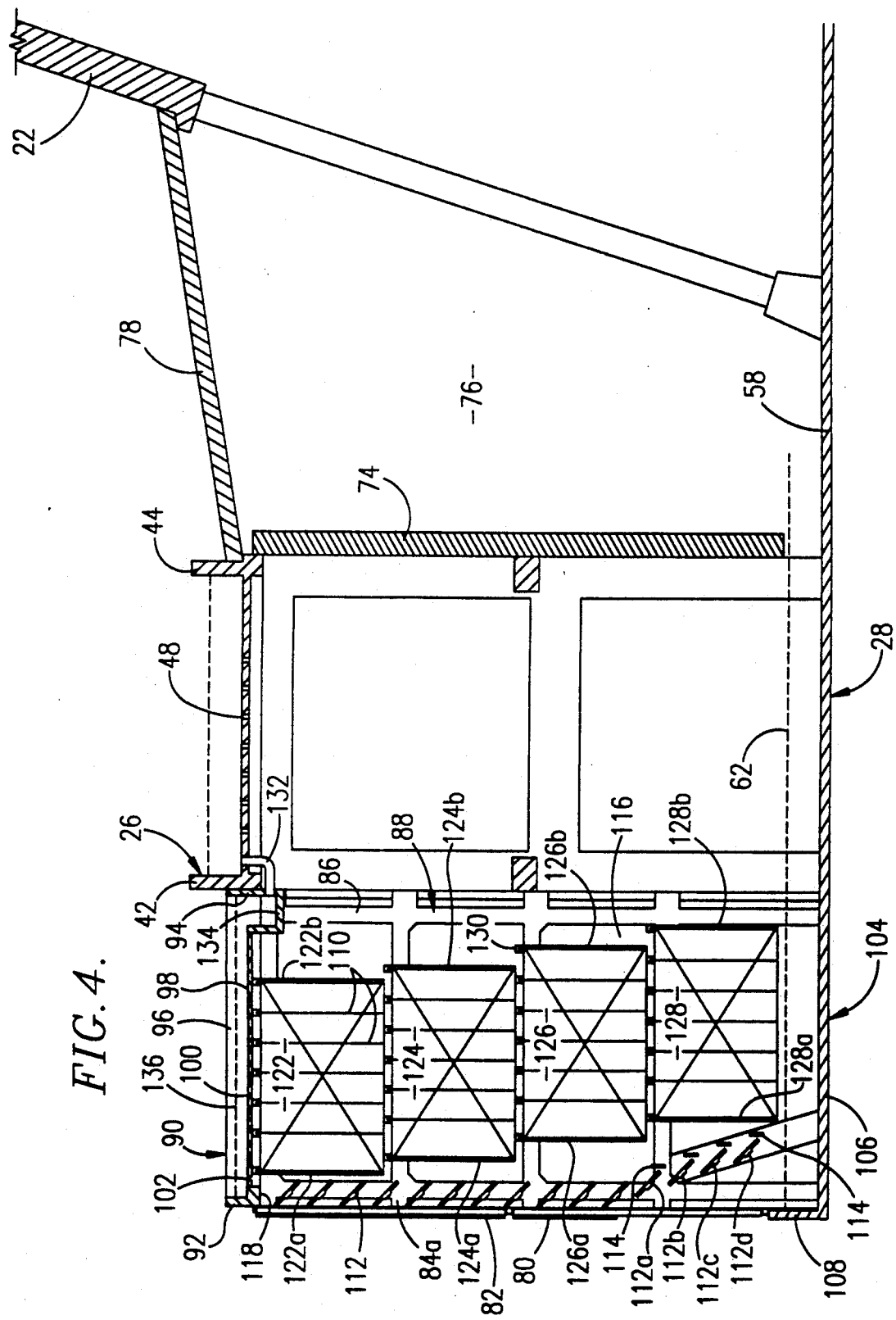

CIRCULAR REHABILITATED INDUSTRIAL CROSSFLOW WATER COOLING TOWER AND METHOD OF REHABILITATION THEREOF

BACKGROUND OF THE INVENTION

1. Field of the Invention

This invention relates to industrial-size water cooling towers, and especially to crossflow towers of generally circular configuration. The invention is particularly useful for rehabilitating hyperbolic cross-flow water cooling towers that have been in use for a period of time to cool the condenser cooling water of power plants or the like.

2. Description of the Prior Art

Electrical generating power plants utilize cooling towers to cool water that is directed to a steam condenser forming a part of the steam generating and condensing portion of the plant. In the case of very large electrical generating plants, concrete hyperbolic cooling towers have found favor because the airflow required for cooling of the hot water which gravitates through the fill assembly of the tower may be induced by the natural draft effect of the hyperbolic stack. This avoids the necessity of utilizing part of the electrical energy generated by the power plant to energize induced draft fan motors that would otherwise be required.

Counterflow, as well as crossflow, hyperbolic cooling towers for power plants have been built and are in operation. Each has its own advantages and disadvantages. One important advantage of a crossflow type tower is the fact that the hot water distribution basin is open, thereby making it easier to maintain the distribution system, as compared with a counterflow tower where the hot water distribution nozzles are buried deep within the tower immediately above the fill structure.

In the case of crossflow towers, however, one problem that has arisen involves icing of the inlet faces of the fill assemblies, thus resulting in consequential damage to the fill components. Damage principally occurs when the ice partially melts and is released from the fill components for fall toward the underlying cold water basin. The ice that is allowed to fall toward underlying fill components damages such components by impact of ice thereagainst.

Many of these concrete crossflow hyperbolic cooling towers have now been in operation for a sufficient number of years that tower performance has decreased because of general deterioration of the fill over time. Furthermore, in those geographic climes where freezing weather is encountered during the winter, damage to the fill assembly as a result of icing of the fill face can be substantial.

In view of the significant initial cost of concrete crossflow hyperbolic towers, it has been difficult to increase the performance of such towers because of the difficulty of modifying the overall structure of the towers. Efforts to minimize fill damage resulting from icing of the fill faces have also met with limited success and acceptance.

For the most part, rehabilitation of circular crossflow, industrial-size water cooling towers, whether of the hyperbolic stack or mechanical draft type, has been limited to replacement of the fill components. Although this restores the performance of the tower to a level approaching that of the original design, the rehab does not increase the performance of the tower over the initial level, and furthermore does very little to mollify the icing problems that previously existed.

SUMMARY OF THE INVENTION

The present invention provides an improved method of rehabilitating essentially circular, industrial-size crossflow water cooling towers to not only increase the performance of the tower over that obtained when it was first built, but also to significantly overcome fill damage attributable to icing of the fill faces.

In accordance with this invention, a separate fill ring is built around the perimeter of the existing tower. The new ring has its own upper hot water distribution deck, a cold water basin below that new deck, and fill components between the distribution deck and the cold water basin for bringing hot water to be cooled into heat interchange relationship with ambient derived air that is pulled into the tower outer ring, directed through the existing inner ring and then discharged from the tower, either as a result of the natural draft of the hyperbolic stack, or by operation of vertically discharging mechanical fans.

The original fill of the initial ring structure is removed, leaving only the added fill of the new outer ring. However, the existing eliminator structure that was mounted in the inner ring adjacent the hot air outlet face of the original fill structure is left in place, thus avoiding the necessity of replacing the eliminators.

The added fill ring around the perimeter of the existing circular crossflow cooling tower has a greater circumference than the inner ring, thus adding to the volume of fill of the tower and increasing its performance over and above the performance value of the original tower. Furthermore, the newly added fill may be made up of components that further increase the tower performance because they are more effective as water-air transfer surfaces than was the case with the old fill.

Another important feature of the present invention is the ability of a circular crossflow water cooling tower owner to rehabilitate an existing tower without the necessity of shutting down the tower for any significant period of time, if at all. This is accomplished with the added benefit of increasing the performance factor of the tower over and above its original design performance.

Rehabilitation of an existing, large circular crossflow cooling tower without inactivation of the tower to any significant degree may be accomplished by the steps of first constructing a fill supporting structural segment outboard of at least one of the original fill sections of the tower, but of a circumferential extent substantially less than the overall circumference of the tower. That structural segment has its own hot water distribution deck, and a cold water basin therebelow. The hot water deck is positioned at a level substantially equal to that of the adjacent hot water distribution basin of the original tower. A water flow path is then established between the hot water distribution basin of the old tower, and the adjacent hot water distribution deck of the new structural segment.

Fill components of desired operational characteristics are then placed in the new structural segment directly outboard of the original fill assembly adjacent thereto.

Another new structural segment is commenced in abutting relationship to the first structural segment built outboard of the original tower ring either upon completion of the first structural segment, or as soon as the confines of the first structural segment have been established. Again, the next segment to be commenced is of significantly less length than the overall circumferential extent of the tower.

Upon completion of the first structural segment, including incorporation of the fill therein, hot water to be cooled is allowed to flow into the hot water distribution deck of the outer structural segment. The openings in the hot water distribution basin which allowed hot water to gravitate onto the fill assembly therebelow are plugged, thereby drying up the old fill assembly. Workmen may then remove the fill members from the original fill assembly section, so that water to be cooled is then allowed to fall only onto the new components of the outboard fill structural segment.

The eliminators of the original tower are however left in position, unless additional access is required for fill removal. In that instance, the eliminators are only temporarily removed and would then be replaced. However, there is no need to provide new eliminators for the newly added fill supporting structural segment.

The sequential steps are repeated of initiating construction of a fill support structure presenting an overlying hot water receptacle, a cold water receptacle thereunder and means for supporting fill defining components therebetween, mounting fill components in each fill supporting structure as it is completed, directing hot water to be cooled to respective hot water receptacles thereof, interrupting delivery of water from the hot water basin overlying the fill section from which each fill means has been removed, and removing the fill means from the fill sections aligned with each subsequently constructed fill supporting structures.

These sequential steps are repeated until fill supporting structures have been constructed and placed in operation around the entire perimeter of the cooling tower and the original fill means has been removed.

In order to eliminate or minimize icing of the inlet faces of the fill components in the new ring around the existing circular tower, a series of movable panels may be mounted across such faces of the fill components so as to block entry of cooling air into the tower where blocked with the panels. In a preferred embodiment of the invention, the individual movable panels when closed cover the upper two-thirds of the air inlet face of the outer newly added ring structure. In most instances, all panels are opened and closed once a year, i.e., fall and spring.

In addition, horizontally oriented, vertically spaced inlet louvers are provided across the inlet faces of the new fill components making up a part of the outer ring structure, with the lowermost series of such louvers mounted in disposition such that they recede in the direction of airflow to cause hot water to be directed onto the inlet face of the lower fill components to preclude icing of such face.

BRIEF DESCRIPTION OF THE DRAWINGS

FIGS. 4, 5, 6 and 7 respectively are fragmentary, vertical cross-sectional views taken on the lines 4—4, 5—5, 6—6 and 7—7 respectively of FIG. 2 looking in the direction of corresponding arrows;

DETAILED DESCRIPTION OF THE PREFERRED EMBODIMENTS

Figure 1:
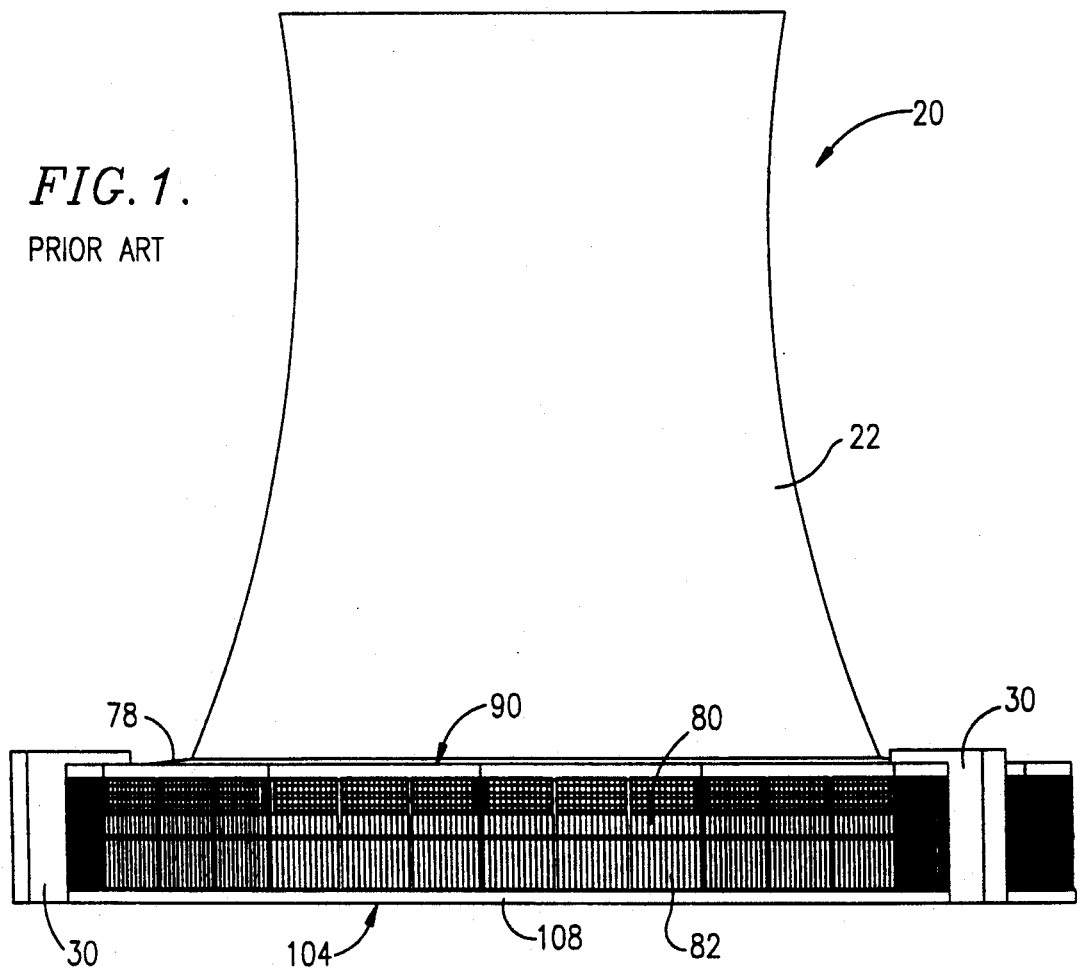
FIG. 1 is a side elevational view of a prior art, essentially circular, industrial-size, hyperbolic crossflow water cooling tower having a cold water basin, a generally annular hot water basin above the cold water basin and generally annular fill means between the basins in disposition to receive hot water from the overlying basin and for delivering cool water to the underlying cold water basin.

An essentially circular, industrial-size hyperbolic crossflow water cooling tower 20 of the type which has been in use to cool water forming a part of the steam generating and condensing section of an electrical generating plant or the like is illustrated in FIG. 1 of the drawings. Tower 20 has a concrete hyperbolic stack 22 that is supported above ground level by a series of upright columns in horizontally spaced relationship so that air may enter the underside of the stack. An annular fill ring broadly designated 24 surrounds the lower end of stack 22 and projects outwardly therefrom.

The annular fill ring 24 is made up of an upper, generally annular hot water receiving basin 26 as well as an underlying cold water basin 28. A plurality of risers 30 extend upwardly from basin 28 at the perimeter of ring 24 and project over basin 26 to deliver hot water thereto. Although not illustrated in FIG. 1, it is to be appreciated that the ring 24 is provided with a series of fill members which cooperatively define a series of fill assemblies located between hot water basin 26 and cold water basin 28. It is to be understood in this respect that although the fill ring 24 of tower 20 is essentially circular, in most instances, hyperbolic towers of the size reflected by FIG. 1 have a perimeter which is made up of a plurality of straight sections which cooperatively define the overall circular configuration of the ring 24. A plurality of horizontally oriented, vertically spaced inlet louvers 34 span the outer face of each of the linear fill segments.

Hyperbolic cooling towers of the type illustrated in FIG. 1 have in many instances been constructed of concrete, except for the fill members and the supports therefore. Thus, stack 22, the pillars (not shown) supporting said stack, and the fill ring 24 including the hot water basin 26 and the cold water basin 28, and the structural supports for basin 26 as well as the fill assembly units are all constructed of reinforced concrete. In like manner, louvers 34 are also fabricated of concrete. The shroud connecting the lower extremity of stack 22 to the inner annular margin of basin 26, may or may not be constructed of concrete and the same is true of the eliminators that are normally provided in the interior of the tower adjacent the outer hot air discharge faces of the fill assembly packs.

Many of the existing concrete hyperbolic cross-flow water cooling towers have been in operation for a time period which mandates rehabilitation thereof to replace and/or update the fill packs, and to increase the performance of the tower, especially where damage has occurred to the air inlet faces of the fill assemblies because of formation of ice on such air inlet faces during operation of the tower in freezing weather. The same thing may be said of certain of the existing essentially circular, industrial-size crossflow water cooling towers which employ induced draft, mechanically driven fans located at and facing upwardly from the central area of the tower, and that operate in geographical areas where icing can occur.

Figure 2:
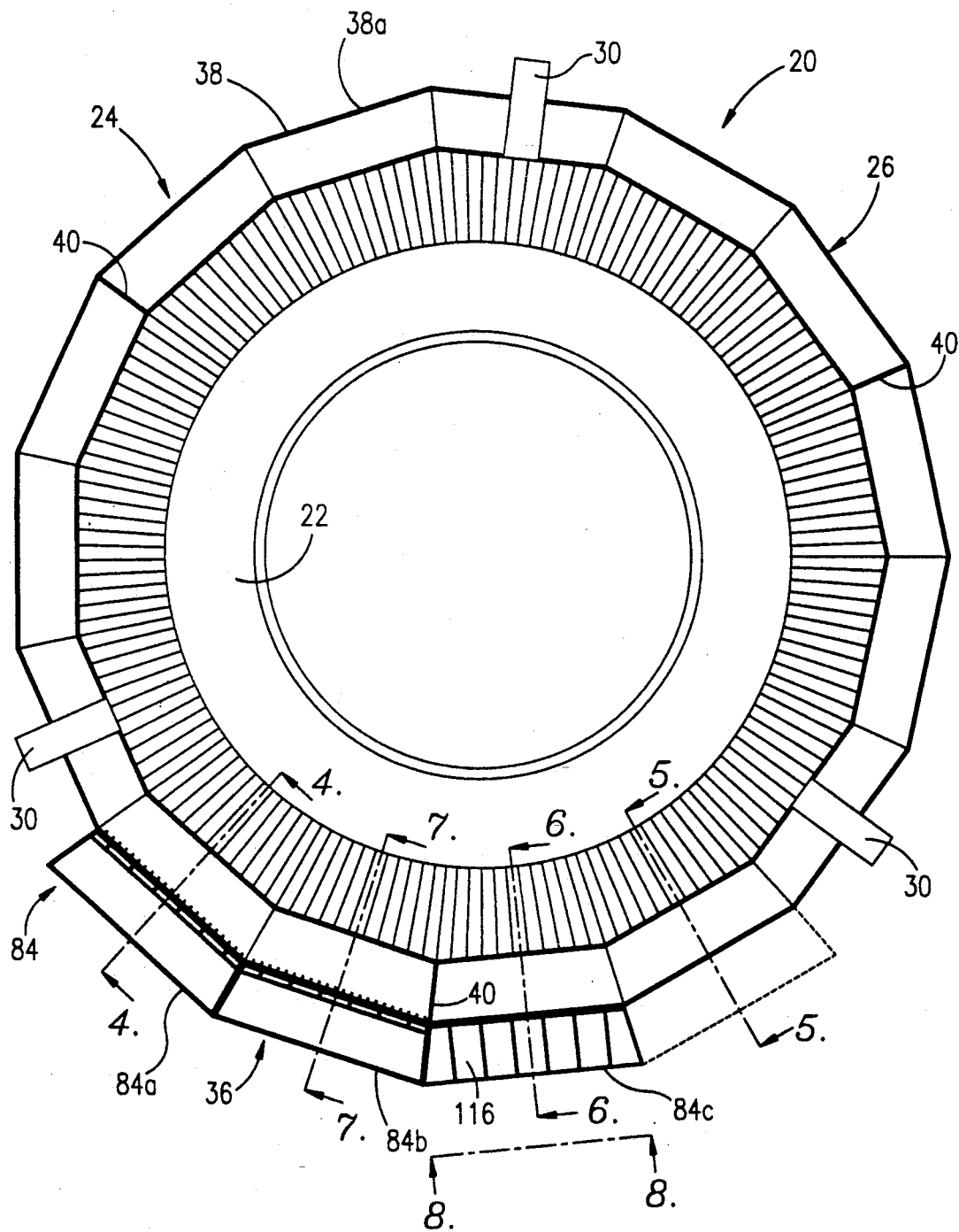
FIG. 2 is a plan view of a hyperbolic cross-flow water cooling tower of the type shown in FIG. 1 but illustrating steps for rehabilitating the tower by sequentially building a series of fill supporting segments around the perimeter of the tower, each of which has an upper hot water distribution deck, and a lower cold water basin, with four of the segments in different phases of construction thereof being illustrated.

Referring initially to FIG. 2 of the drawings, the method of rehabilitating an existing circular hyperbolic tower 20 in accordance with a preferred procedure of this invention is shown in an essentially diagrammatic manner in that figure. Rather than simply change out the existing fill of the crossflow tower, in order to rehabilitate such tower, an entirely new fill ring broadly designated 36 is constructed around the perimeter of tower 20 in circumscribing, essentially abutting relationship to the existing fill ring 24. A typical concrete hyperbolic tower of the type illustrated in FIG. 1 may, for example, have a diameter which may be as large as 600 feet, and be as much as 500 feet in height.

As is evident from FIG. 2, the fill ring 24 of many existing concrete hyperbolic cooling towers, although essentially circular in cross section, is actually made up of a series of individual fill sections 38 having rectilinear outer faces 38a. It can be seen that in a typical tower there may be as many as 15 or more individual sections 38 making up fill ring 24. In like manner, there are normally a multiplicity of hot water supply risers 30 with three being a typical number as is illustrated in FIG. 2. In the instance of the tower shown in FIG. 2, the hot water distribution basin 26 is made up of 15 individual segments each commensurate in length with respective fill sections 38. Each riser 30 therefore delivers water to basin segments on opposite sides thereof, representing a 120° arc of the entire circumference of the fill ring 24. Upright, radially extending cross walls 40 (FIG. 2) located at radials 120° apart, and positioned in equally arcuate spaced relationship from respective risers 30, serve as dividers which segregate the entire annular basin 26 into three discrete basin sections.

Figure 5:
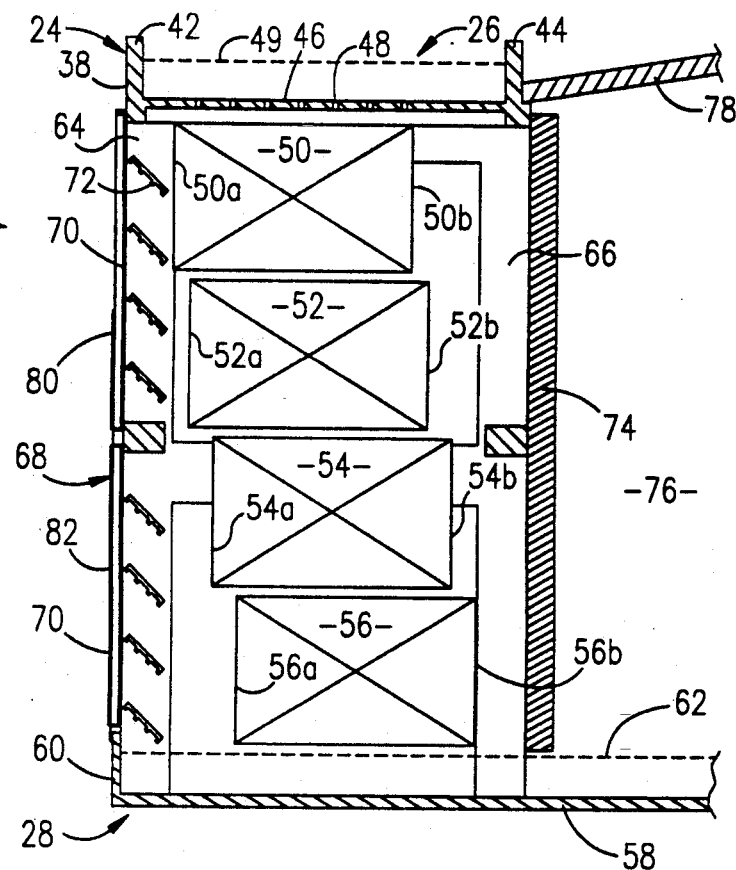
Figure 6:
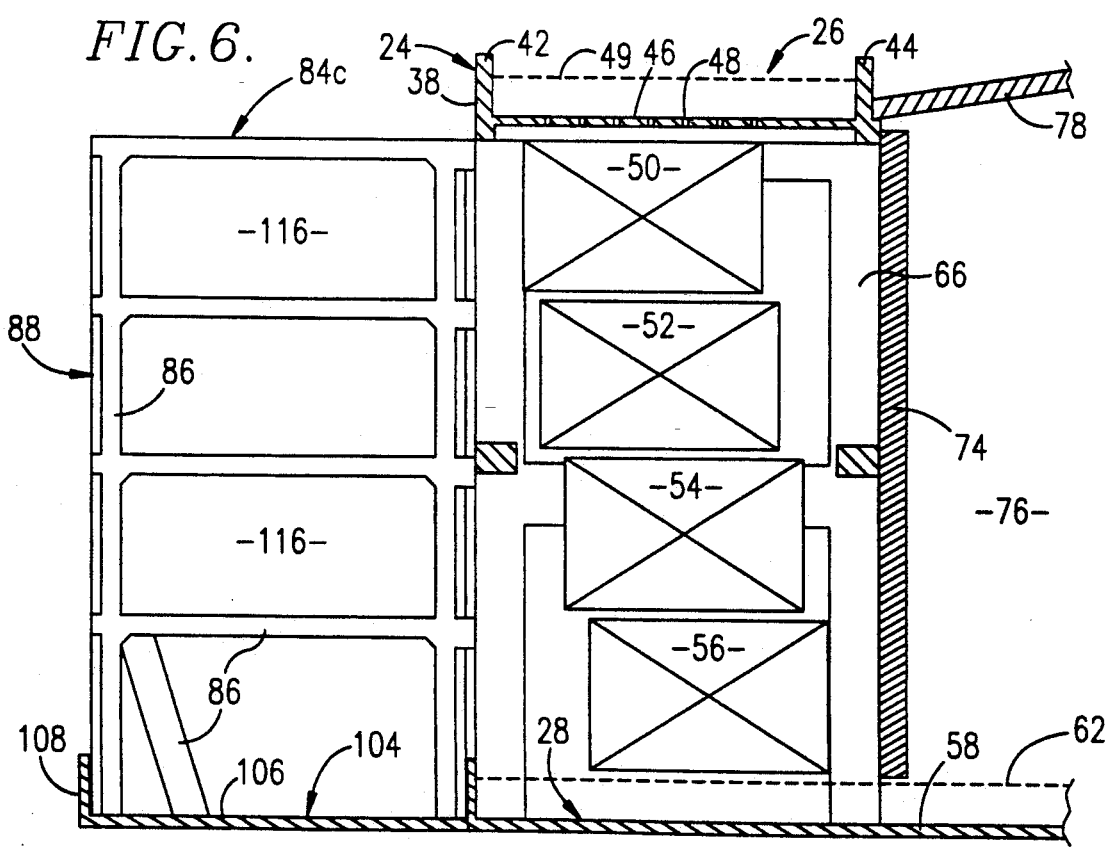

As is best shown in FIG. 5, the hot water basin 26 of fill ring 24 has an upright outboard wall 42 and an upright inboard wall 44 which, along with the horizontal bottom wall 46, cooperate to form the open top basin 26. The bottom wall 42 has a series of openings 48 therein which normally receive respective distribution nozzles (not shown) for directing hot water onto the upper face of the underlying fill pack assembly 50 immediately therebelow (FIG. 6). The normal level of hot water in basin 26 is indicated by the dashed line 49.

Again viewing FIG. 5, in a typical hyperbolic tower as depicted, a series of fill packs are normally provided with the illustrative tower as shown having fill assemblies 50, 52, 54 and 56 in vertically stacked relationship underlying annular hot water basin 26. The lower fill assembly 56 is directly above cold water basin 28 made up of a concrete floor 58 provided with an outer upright wall 60 which defines the perimeter of the cold water basin 28. The normal level of cold water in the basin 28 is shown schematically by the dashed line 62.

The fill ring 24 has a series of elongated, precast concrete structural members 66 which present box-like frame assemblies 68 that support the overlying hot water basin 26, as well as the fill assemblies 50-56. It is to be appreciated in this respect that generally there are a number of the box-like frame assemblies 68 for each of the fill sections 38. In an exemplary installation, 28 of the frame assemblies 68 would be provided for each section 38, i.e., four in a vertical direction and seven in a horizontal direction. It is also to be observed from FIG. 5 that the fill packs 50-56 are generally oriented such that they step back from the overall annular cool air inlet 64 of the tower defined at the upper and lower extremities thereof by the lower edge of wall 42 and the upper edge of wall 60. It is to be understood in this respect that the annular cool air inlet 64 is in fact made up of a series of openings 70 presented by the outwardly facing portions of individual frame assemblies 68. A plurality of horizontally oriented, vertically spaced concrete inlet louvers 72 are provided across each air inlet opening 70, and supported by opposed upright structural members 66 of assemblies 68. Louvers 72 are nominally about six feet wide in a tower of the type depicted in the drawings.

Each of the fill assemblies 50-56 has a series of splash-type fill members comprising elongated, horizontally disposed fill bars that are in horizontally and vertically spaced relationship and that generally are parallel with the airflow through the fill ring 24. The air inlet faces 50a, 52a, 54a and 56a of fill assemblies 50-56 are not only stepped back from the air inlet 64 of fill ring 24, but often times are also inclined so that the face recedes in the direction of airflow toward the lower forward margin thereof. In like manner, the rear hot air outlet faces 50b, 52b, 54b and 56b may be inclined in the same direction to be parallel to the inlet faces 50a-56a.

Droplets of water that are entrained in the hot air emerging from the air outlet faces 50b-56b of assemblies 50-56 are removed from the airstream by upright eliminator structures 74 carried by the structural members outboard thereof within the central plenum chamber 76 of the tower. The eliminators are fabricated of either plastic, or of wood. The plenum is defined by the cold water basin 28 and the annular shroud 78 surrounding the lower extremity of the hyperbolic stack 22.

Referring further to FIG. 5 illustrating an existing prior art hyperbolic concrete cooling tower, at least one such tower has been provided with baffle means on the inlet face 64 thereof to permit selective restriction of the flow of cooling air into the tower. The baffle means has taken the form of a series of upper upright panels 80 across a portion of the air inlet 64 and a series of lower upright panels 82 across the lower portion of the air inlet 64. Panels 80, when closed, restrict air inflow through only a portion of the air inlet 64, while closed panels 82 preclude entry of air into a respective fill section 38 throughout the entire lower one-half of the air inlet 64. Usually, the panels 80 and 82 when closed, allow inflow of air through only about one-third of the entire area of air inlet 64. However, when the panels 80 and 82 are open, there is essentially unrestricted airflow into the fill ring 24 through the annular air inlet 64.

The steps of rehabilitating tower 20 to upgrade the performance of the tower and permit replacement of the original fill, are indicated by the schematic representations of FIGS. 2, 4, 6 and 7. It can be observed from these Figures that a series of individual fill supporting structures 84 are fabricated around the perimeter of the existing tower 20, with one structure 84 being provided for each of the fill sections 38, although that is not a requirement. However, the individual fill supporting structures 84 generally make up no more than about one-half of the total circumferential extent of tower 20 in order to minimize, and preferably eliminate the need for shutting the tower down during the rehabilitation process.

Figure 8:
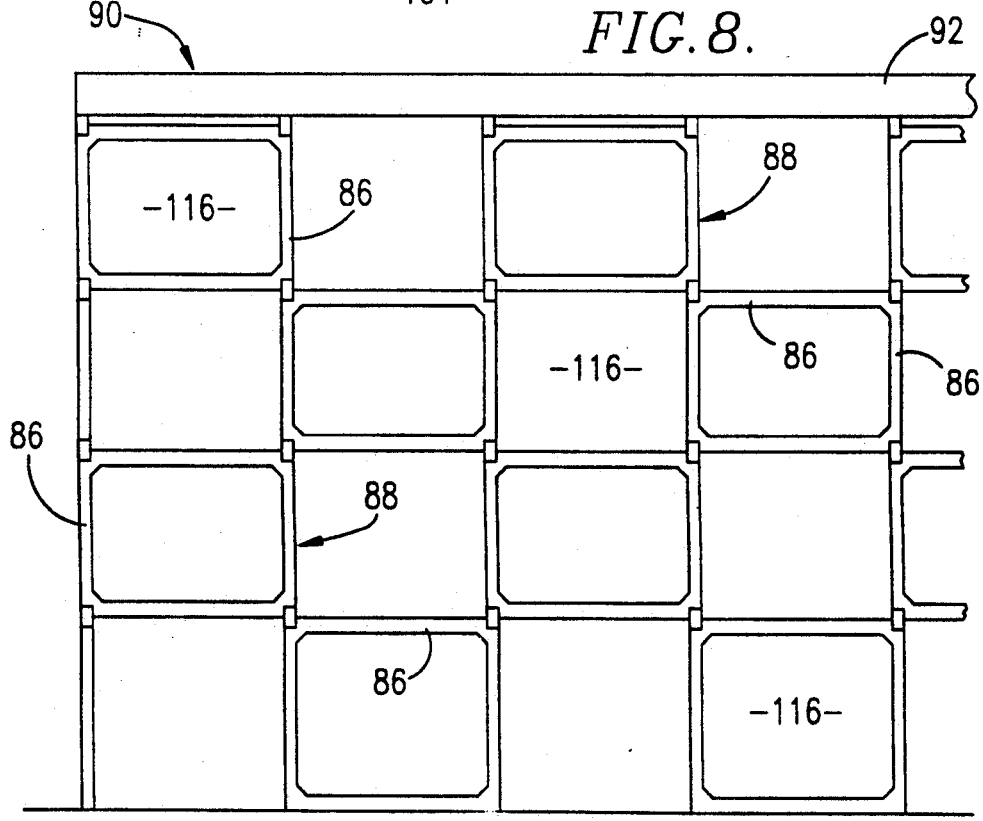
FIG. 8 is a fragmentary, vertical plan view of the portion of the tower indicated by the arrows 8—8 and associated lines of FIG. 2.
Figure 9:
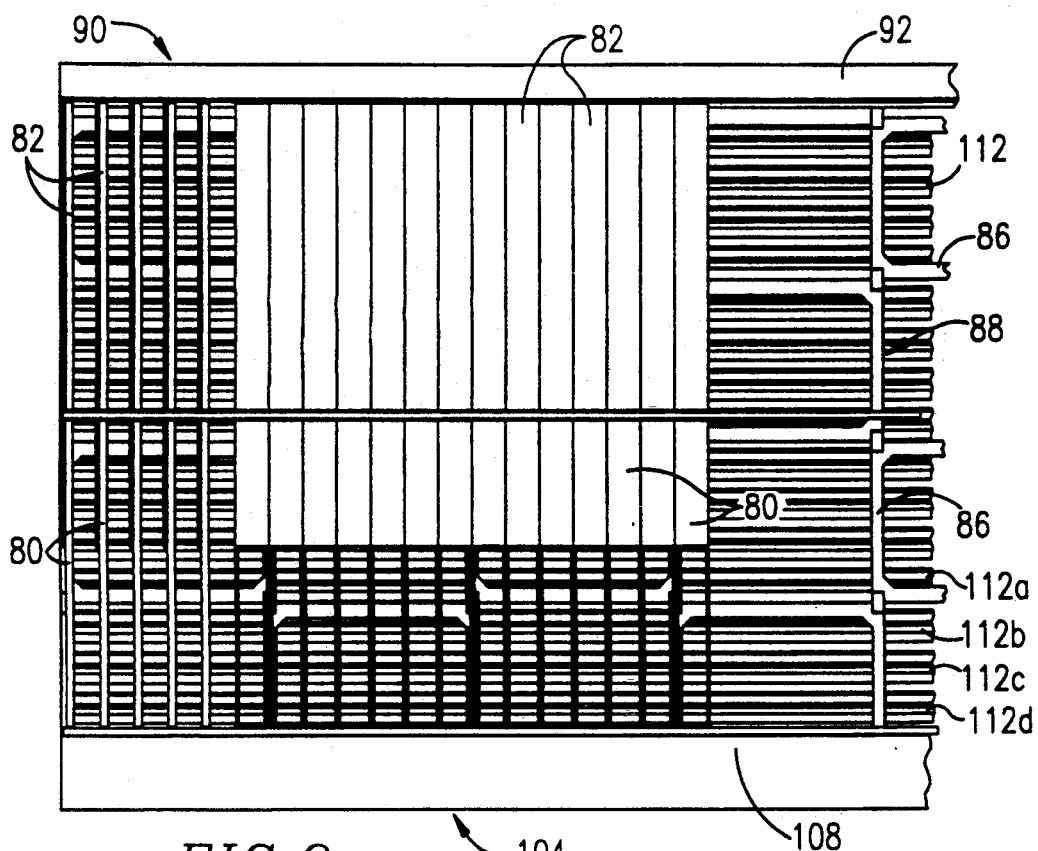
FIG. 9 is a fragmentary, elevational view of a portion of the outer air inlet face of the leftmost outer fill supporting segment illustrated in FIG. 2, and through which the sectional view 4—4 is taken, and illustrating the movable panels which are optionally provided on the outer, newly added fill ring to limit icing of the fill face.

The first step of the rehabilitation process of this invention involves fabricating a fill supporting structure 84a (FIG. 2) in direct alignment with one of the fill sections 38 of the existing tower. The structure 84a is preferably fabricated of a number of precast concrete members 86 (FIGS. 4 and 8) which cooperate to present a series of box-like frame assemblies 88 similar to the box-like frame assemblies 68. Thus, it is to be preferred that the number of frame assemblies 88 of the structure 84a be the same as the number of frame assemblies 68 making up a fill section 38 radially aligned therewith. An exemplary prefab fill supporting assembly made up of precast concrete members is illustrated and described in detail in U.S. Pat. No. 3,834,681. The components and techniques for erection thereof as described in the U.S. Pat. No. 3,834,681 patent may be employed for fabrication of fill supporting structure 84a, and therefore the U.S. Pat. No. 3,834,681 patent description and drawings are incorporated herein and made a part hereof by reference thereto (compare, for example, FIG. 6 of the U.S. Pat. No. 3,834,681 patent with FIG. 8 herein).

During construction of the structure 84a, a concrete open-topped hot water distribution receptacle 90 is provided at the upper part of the structure 84a in general horizontal alignment with the adjacent hot water basin 26. Thus, receptacle 90 has an outboard, upright wall 92, an upright inboard wall 94 directly adjacent to and abutting the outer face of existing hot water distribution basin wall 42, a pair of opposed radially oriented end walls 96 and a bottom wall 98. The floor or wall 98 has a series of openings 100 therethrough which are adapted to receive a plurality of hot water distribution nozzles similar to the nozzles that were provided in the openings 48 in bottom wall 46 of basin 26.

As is most evident from FIG. 4, bottom wall 98 is also provided with a series of openings 102 immediately adjacent upright outboard wall 92 in order to permit hot water to gravitate downwardly across the air inlet face portion of the structure 84, as will be explained in greater detail hereinafter. The openings 102 may be in the form of a series of aligned, elongated slots rather than a plurality of circular openings, in order to permit a larger quantity of water to flow downwardly through such openings or slots and thereby enhance the anti-icing properties of the rehabilitated tower. Furthermore, slot or opening restricting means may be replaceably provided over the slots or openings 102 during summertime operation of the tower when it is not desired to allow hot water to cascade down over the front faces of the fill assemblies making up the new fill ring 36. During wintertime operation, these restrictors may be selectively opened or removed to allow a controlled amount of hot water to flow through the slots or openings 102 for fill de-icing purposes.

An open-topped cold water basin 104 is also constructed during fabrication of structure 84a in disposition such that it is aligned with the existing cold water basin 28 of tower 20. To this end, basin 104 has a bottom wall 106 that is an extension of previously existing wall 58, and an outer upright wall 108 of a height generally equivalent to that of basin wall 60. Upon completion of the process of constructing structure 84a, portions of wall 60 are removed down to the level of bottom wall 106 so that cold water may freely flow into the basin 104.

Upon completion of the structural frame assemblies 88 defining structure 84a, the next step may be mounting of fill hangers 110 in the interior of the ring 36 between hot water receptacle 90 and cold water receptacle or basin 104, or the concrete inlet louvers 112 may be mounted in position as shown in FIG. 4. In the case of louvers 112, they are each nominally about four feet wide. As can be seen from FIG. 4, the original, wide inlet louvers 72 of fill section 38a aligned therewith are removed and replaced with new louvers 112. A larger number of louvers may be provided on structure 84a than was the case with the aligned section 38a (FIG. 5), and the lower louvers 112a, 112b, 112c and 112d respectively, be stepped back in the direction of airflow, with the degree of overlap thereof being approximately half of the louver immediate there-above and therebelow. Horizon, upright baffles 114 are also provided adjacent the rear margins of each of the louvers 112a-112d but spaced therefrom to limit splash of water from the lower edges of each of the louvers 112a-112d onto the air inlet face of the adjacent fill assembly.

The individual, horizontally disposed fill bays 116 (FIGS. 4 and 8) defined by concrete members 86 and extending essentially horizontally from the cool air inlet opening 118 of the structure 84a to the hot air outlet opening 120 thereof receive respective fill assemblies 122, 124, 126 and 128 respectively which are suspended from the upright hangers 110 carried by cross supports 130. Hangers 110 comprise grids constructed of glass fiber reinforced polyester material, or stainless steel, and are spaced horizontally one from another fore and aft of respective bays 116.

Each fill assembly 124–128 has a series of fill components comprising horizontally positioned bars that are vertically and horizontally spaced relatively in disposition such that they are also offset in a manner such that water gravitating from one bar may fall a distance greater than the space between each vertically spaced row of bars. In a preferred embodiment of the invention, fill bars as shown in U.S. Pat. No. 4,663,092, incorporated herein by reference thereto, are employed in the initial lengths of fill assemblies 122–128 adjacent the air inlet face or opening 118 while bars as depicted and described in U.S. Pat. No. 5,112,537, and also incorporated herein by reference thereto, are mounted in the portions of the fill assemblies which are downstream of the U.S. Pat. No. 4,663,092 patent bars. It is contemplated in this respect that the bars as shown in the U.S. Pat. No. 4,663,092 and U.S. Pat. No. 5,112,537 patents be located in an end-to-end aligned relationship with the outboard bars being of the U.S. Pat. No. 4,663,092 patent type, while the inboard bars are of the U.S. Pat. No. 5,112,537 patent type.

It is also to be observed from FIG. 4 that the air inlet faces 122a, 124a, 126a and 128a of fill assemblies of 122-128 respectively are stepped back relatively as the cold water basin or receptacle 104 is approached to compensate for the tendency of the hot water gravitating through the fill assemblies to be pulled back toward the plenum 76 of the tower by the inflowing cool air. Although the air inlet faces 122a-128a of the fill units 122-128 are depicted as being vertical, it is to be understood that such faces may be inclined with respect to the vertical to an extent approximately equal to the degree of pull back of the water by the airstream. In like manner, the hot air outlet faces 122b, 124b, 126b and 128b of fill assemblies 122-128 are vertically offset relatively to the same degrees as the offset of faces 122a-128a. Similarly, faces 124b-128b may be inclined if the inlet faces are inclined to present a parallelogram configured pack. The extent of offset of the fill assemblies, or the angle of inclination of the inlet and outlet faces thereof is usually determined by a rule of thumb to present an effective slant angle of about 12° with respect to the vertical.

Figure 3:
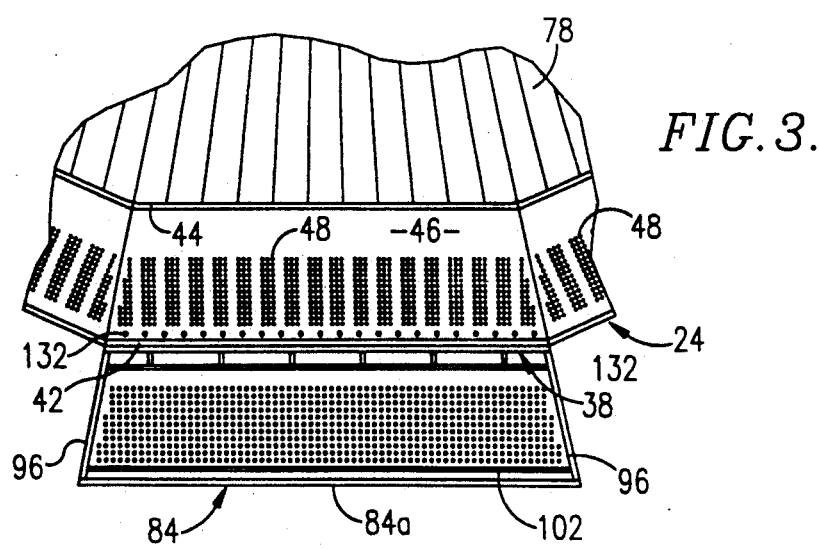
FIG. 3 is a fragmentary enlarged plan view of the leftmost outer fill segment and associated original tower fill ring depicted in FIG. 2, which better illustrates the openings and water distributors in the floor of the inner hot water distribution basin and the outer hot water distribution deck.

During construction of the initial fill supporting structure 84a, a series of generally L-shaped hot water conveying conduits 132 (FIGS. 2 and 4) are mounted on the hot water basin 26 of existing fill section 38 for directing water from basin 26 into the new basin or receptacle 90. To this end, the bottom wall 98 of receptacle 90 may be provided with an elongated step down flume 134 adjacent inboard wall 94 in order to directly receive hot water from respective conduits 132. As is evident from FIG. 3 for example, a substantial number of conduits 132 are provided along the length of and inboard of wall 42.

As previously indicated, once construction of structure 84 has progressed to a point that the end extremities thereof are established, fabrication of a second structure 84b next adjacent thereto may be commenced. In the meantime, work on the initial structure 84a is continued toward completion thereof. In like manner, once the end extremities of structure 84b are established, work may be initiated on the structure 84c next adjacent thereto.

Returning to the first structure 84 to be constructed (84a), after the fill assemblies 122-128 have been placed in position in respective bays 116 of structure 84a, workmen then proceed to plug the openings 48 of the section 38a of the existing tower which overlie the fill assemblies 50-56 directly aligned with the fill assemblies 122-128 mounted in the structure 84a. As a consequence, water is no longer allowed to gravitate onto the fill assemblies 50-56 which are inboard of the newly added structure 84. Workmen may then commence to remove the fill members and supporting grids making up fill assemblies 50-56 in the section 38a of the existing tower structure aligned with structure 84a. Vertical plastic sheets may be placed over the ends of the section 38a of tower 20 aligned with structure 84a while the workmen are removing the old fill members of fill assemblies of 50-56 to prevent water on opposite sides of the fill being removed from impinging on that area and adversely affecting working conditions for fill dismantlement.

As soon as the old fill members which made up assemblies 50-56 have been removed, water may then be allowed to flow from basin 26 into the receptacle 90 of the newly added structure 84a. The level of such water is indicated by the dashed line 136 in FIG. 4. The blocking means, such as plugs, placed in the openings 48 in bottom wall 46 of the basin 26, are left in place to prevent water from gravitating through such openings into the open space below. It is at this point that the openings may be formed in cold water basin wall 60 directly adjacent the fill structure 84 that has been completed, or nearly completed, so that cold water may flow into the basin 104.

Gravitational delivery of water from the receptacle 90 onto the underlying fill 122 brings the hot water into crossflow relationship to horizontal cooling airstreams entering opening 118 as a result of the natural draft induction of air into the tower. The partially cooled water leaving the lower portion of fill assembly 122 is distributed over the top of the fill 124 next therebelow to again bring the water into crossflow cooling relationship with air flowing horizontally through respective bays 116. The water continues to gravitate downwardly through respective fill units until reaching cold water basin 62.

The panels 80 and 82 mounted on the air inlet face of each section 38 of fill ring 24 are preferably moved to the corresponding air inlet face of a respective, aligned fill structure 84. In view of the fact that the linear length of each section 84 is somewhat longer than that of an aligned section 38, an additional number of panels may be required. However, in view of the fact that each panel is nominally about three feet in width, additional panels of generally that same width may be added as necessary to provide a barrier to airflow when the panels are all closed.

Figure 7:
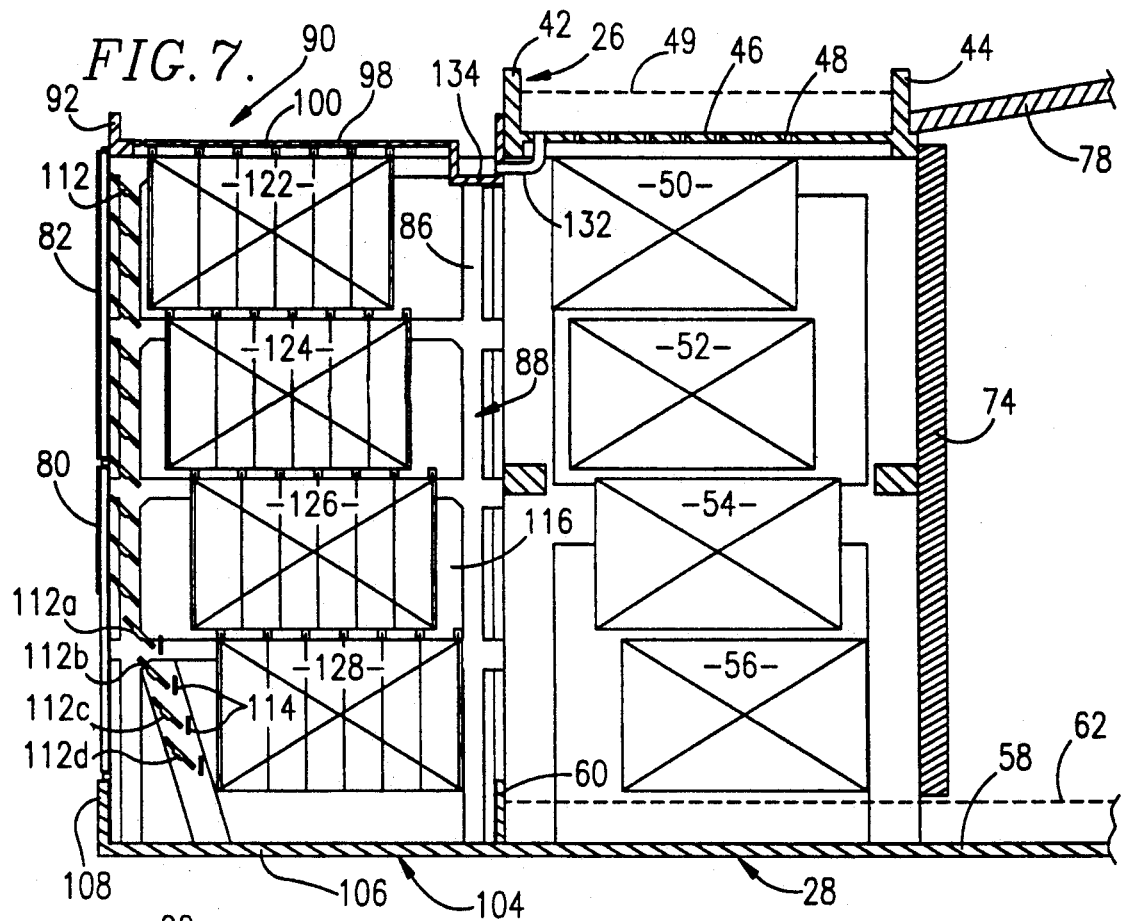

However, it is to be noted from FIGS. 4 and 7, upon reinstallation of the panels 80 and 82, they are reversed so that complete blocking of air in the upper part of the fill supporting structure 84 may be accomplished, while partial blocking of air inflow is available from the lower part of the tower. A preferred arrangement in this respect is such that for winter operation, two-thirds of the air inflow opening may be selectively blocked while air continues to flow into the lower one-third of the tower opening. In this respect, it is understood that the panels 80 and 82 are all mounted for individual pivoting movement about respective vertical axes so that opening and closing of the panels is under the full control of the tower owner.

The sequential steps of initiating construction of a fill supporting structure 84 next adjacent a structure under construction, accompanied by completion of the structures 84 one by one around the perimeter of the tower is carried out until the full perimeter of the tower has been encased by addition of the new fill ring 36. It can be seen that the fill ring 36 can be added to tower 20 without the necessity of significantly, if at all, interfering with the normal operation of the tower. At any one time, only a small section of the tower is out of operation, and even that is for a very short interval, i.e., the time necessary to remove the old fill members from one of the sections 38.

It is noteworthy that the eliminators 74 may be left in their original position without the necessity of moving such eliminators to the air outlet face of a respective added fill structure 84, in that the eliminators 74 perform the same manner as originally intended, even through the fill units are in greater spaced relationship therefrom.

An especially important feature of the present process of rehabilitating an existing industrial-size circular tower is the fact that the performance of the tower may be increased to a significant extent by virtue of the fact that the new fill ring added around the perimeter of the existing ring increases the fill capacity of at least 15%-20%, attributable not only to increase fill area, but also the lighter water loading that obtains.

Although in the preferred embodiment of the invention, the new fill ring 36 is positioned in abutting relationship to the existing ring 24, it is to be appreciated that ring 36 may be located at any desired distance outboard of ring 24. In this way, the capacity of the tower may be increased to a desired extent at a much lower overall cost than would be the case if a new tower was constructed of equal performance. The only requirement in this respect is that the conduits 132 be of adequate length to convey hot water from basin 26 to receptacles 90 and that an accommodation be made to transfer from the outer basin 104 to the existing cold water basin 28.

The exemplary tower 20 illustrated in the drawings is depicted as having three external risers 30 for delivering hot water to be cooled to the distribution basin 26. It is to be understood in this respect that where the tower to be rehabilitated has external risers of the type illustrated, the structures 84 at the positions of the risers are simply modified to accommodate the upcomer. If the tower has internal risers, then such accommodation therefore is not necessary.

Potential icing problems that were present during operation of the existing tower can be obviated not only by allowing hot water during freezing weather operations to flow down in front of the inlet faces of the fill assemblies 122-128, but also by closing the panels 80, 82 so that cooling air may enter only the lower one-third of the air inlet opening 118.

Figure 10:
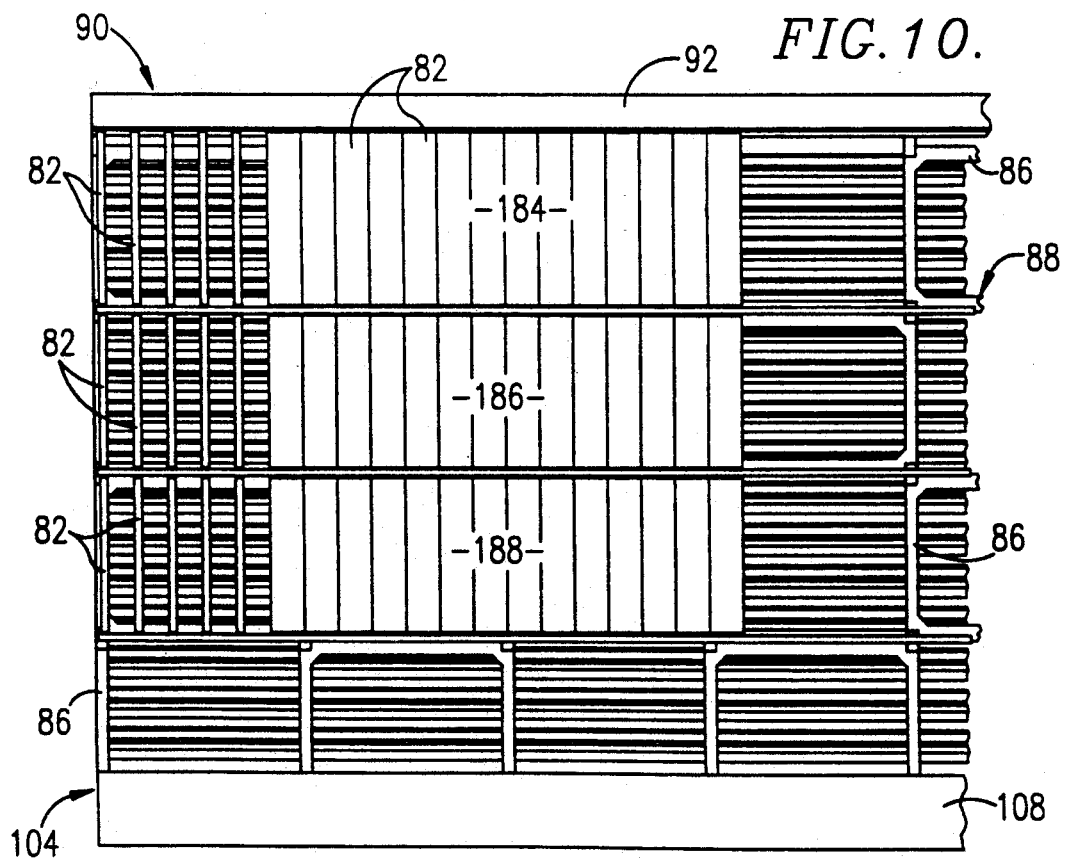
FIG. 10 is a fragmentary, elevational view similar to FIG. 9, but illustrating an alternate embodiment of the movable panels for limiting icing of the fill face.

In the alternate embodiment of the invention illustrated in FIG. 10, three panel sections 184, 186 and 188 are provided in place of the panel section 80 and 82. In this instance, each of the panel sections 184-188 is made up of a series of individual panels 182 that may be individually closed to block entry of air into the corresponding bay 116 aligned therewith, or opened for free entry of air thereto. It can be seen from FIG. 10 that each panel section 184-188 is of essentially the same height as a respective bay 116. However, panels are not provided across the lowermost bay 116 which allows air to enter that part of the structure 84 during all seasons.

When three panel sections 184-188 as shown in FIG. 10, are provided the operator of tower 20 has somewhat greater control over the amount of air permitted to enter the tower, and the location of the airstreams in a direction vertically of a respective fill structure 84. For example, only the panels 182 of the section 184 may be closed While leaving section 184 and 186 open. Under different ambient conditions, panels 182 of the sections 184 and 186 may all be closed, leaving the panels of section 188 open. In addition, the panels 182 of all three sections 184-188 may be closed. Finally, the number of panels closed or left open may be selectively varied around the perimeter of the tower to accommodate different prevailing wind conditions.

Although the description herein is particularly directed to rehabilitation of existing concrete cooling towers by fabrication of a concrete ring around the perimeter of the tower, it is to be understood that the new fill ring structure may be constructed of wood, plastic, a combination of wood and plastic, a combination of concrete and plastic, or a combination of concrete and wood, if so ordered by a customer.

I claim:

1. In a method of rehabilitating an essentially circular, industrial-size crossflow water cooling tower having a cold water basin, a generally annular hot water basin above the cold water basin, and generally annular fill means between the basins in disposition to receive hot water from the overlying basin and for delivering cool water to the underlying cold water basin, said fill means being made up of a series of discrete fill sections around the circular extent of the tower with each of the sections having an upright outer cold air inlet face for reception of ambient cool air and an upright inner hot air outlet face, the hot air outlet faces of the fill sections cooperating to define the perimeter of an inner hot air plenum chamber within the tower, there being means for inducing flow of cooling air through the fill sections from the air inlet faces thereof to the hot air outlet faces and for discharging the hot air which collects in the plenum chamber back to the atmosphere, the improved steps of carrying out the rehabilitation of the tower without significantly interfering with the normal operation thereof:

directing hot water to be cooled into the hot water basin of the tower for gravitational delivery therefrom onto the fill means therebelow;

inducing flow of cooling air through the fill sections of the tower in crossflow relationship to water gravitating downwardly through the fill sections;

collecting the water discharged from the lower portion of the fill sections in the cold water basin;

continuing the operation of the cooling tower by directing hot water to be cooled into the hot water basin and inducing flow of cooling air through the fill sections in crossflow relationship to the water gravitating downwardly therethrough while constructing a first fill supporting structure outboard of at least one of the fill sections, but of a circumferential extent no more than about one-half of the entire circumference of the fill sections extending around the perimeter of the tower, said first structure being constructed to present a first upper hot water distribution receptacle, a first cold water receptacle therebelow, and means for supporting first fill defining components between the first hot water receptacle and the first cold water receptacle;

mounting first fill defining components in said first fill supporting structure below the first hot water receptacle;

providing a hot water flow path between the hot water distribution basin and the first hot water receptacle;

initiating the construction of a second fill support structure outboard of at least one other fill section, but of a circumferential extent no more than about one-half of the entire circumference of the fill sections extending around the perimeter of the tower, said second structure being constructed to present a second upper hot water distribution receptacle, a second cold water receptacle therebelow, and means for supporting second fill defining components between the second hot water receptacle and the second cold water receptacle;

mounting second fill defining components in said second fill supporting structure below the second hot water receptacle;

providing a hot water flow path between the hot water distribution basin and the second hot water receptacle;

removing the fill means making up each discrete fill section aligned with the first fill supporting structure;

allowing water to flow from the hot water distribution basin to the first hot water receptacle along said flow path therefore;

interrupting release of water from the hot water basin overlying the space previously occupied by each discrete fill section aligned with the first fill supporting structure; and repeating the sequential steps of initiating construction of a fill support structure presenting an overlying hot water receptacle, a cold water receptacle thereunder and means for supporting fill defining components therebetween, mounting fill components in each fill supporting structure as it is completed, directing hot water to be cooled to respective hot water receptacles thereof, interrupting delivery of water from the hot water basin overlying the fill section from which each fill means has been removed, and removing the fill means from the fill sections aligned with each subsequently constructed fill supporting structures, said sequential steps being repeated until fill supporting structures have been constructed and placed in operation around the entire perimeter of the cooling tower and the original fill means has been removed.

2. A method of rehabilitating an essentially circular, industrial-size crossflow water cooling tower as set forth in claim 1 wherein is included the steps of constructing the fill supporting structures by erecting a series of prefabricated concrete beams and support pillars which cooperate to define an essentially box-shaped structure.

3. A method of rehabilitating an essentially circular, industrial-size crossflow water cooling tower as set forth in claim 1 wherein is included the steps of constructing each of the fill supporting structures in sequential order in next adjacent relationship to the fill supporting structure which has just been completed.

4. A method of rehabilitating an essentially circular, industrial-size crossflow water cooling tower as set forth in claim 1 wherein is included the step of restricting the entry of cooling air into the circular tower around at least a portion of the perimeter thereof to limit the formation of ice on the air inlet faces of the fill components during freezing weather operation of the tower.

5. A method of rehabilitating an essentially circular, industrial-size crossflow water cooling tower as set forth in claim 4 wherein is included the step of limiting entry of cooling air to only the lower portion of the air inlet faces of the fill components.

6. A method of rehabilitating an essentially circular, industrial-size crossflow water cooling tower as set forth in claim 4 wherein is included the step of limiting the entry of cooling air to no more than the lower one-third portion of the air inlet faces of the fill components.

7. A method of rehabilitating an essentially circular, industrial-size crossflow water cooling tower as set forth in claim 1 wherein is included the steps of mounting the fill components in each fill supporting structure in disposition such that the air inlet faces of the fill components recede away from the air inlet as the cold water receptacle therebelow is approached, and directing hot water toward the air inlet face of the lowermost fill components to minimize the formation of ice on said lowermost fill component inlet face thereof during freezing weather operation of the tower.

8. A method of rehabilitating an essentially circular, industrial-size crossflow water cooling tower of the type as set forth in claim 1 and which has a first series of inlet louvers across the air inlet faces of the fill means, said method including the steps of providing a second series of inlet louvers across the air inlet faces of the fill components, and removing the first series of inlet louvers across the air inlet faces of the fill means.

9. A method of rehabilitating an essentially circular, industrial-size crossflow water cooling tower of the type as set forth in claim 1 and which has a series of inlet louvers across the air inlet faces of the fill means, said method including the step of removing the air inlet louvers at the time of removal of the preexisting fill means from the tower.

10. A method of rehabilitating an essentially circular, industrial-size crossflow water cooling tower as set forth in claim 1 wherein is included the step of constructing the fill supporting structures in a generally abutting relationship to adjacent fill sections.

11. A rehabilitated, essentially circular, industrial-size crossflow water cooling tower comprising:

inner ring structure which includes a cold water basin, a generally annular hot water basin above the cold water basin, generally annular fill supporting means between the basins in disposition such that prior to rehabilitation, fill carried by the support means therefore received hot water from the overlying basin and delivered cooled water into the cold water basin;

outer ring structure outboard of the inner ring structure which includes an upper hot water distribution receptacle in general horizontal alignment with the hot water distribution basin, a cold water receptacle below the hot water distribution receptacle and communicating with the cold water basin, and a series of spaced, generally horizontal fill defining components between the hot water receptacle and the cold water receptacle, said fill components cooperating to define an upright outer air inlet face and an upright inner hot air outlet face;

means for providing a hot water flow path between the hot water distribution basin and the hot water receptacle; and means for inducing flow of cooling air through the fill components from the air inlet faces thereof to the hot air outlet faces and for discharging hot air from the central part of the tower, the space between the hot water distribution basin and the cold water basin being devoid of fill defining means whereby cooling air entering the tower flows through the fill defined by the fill components in crossflow relationship to the hot water gravitating from the hot water receptacle to the cold water receptacle and is thereafter discharged from said central part of the tower.

12. A rehabilitated, essentially circular, industrial-size crossflow water cooling tower as set forth in claim 11, wherein is provided a series of vertically spaced, horizontally oriented inlet louvers across the air inlet faces of the fill defined by said fill components, and a series of vertically spaced eliminators in the innermost portion of the inner ring structure.

13. A rehabilitated, essentially circular, industrial-size crossflow water cooling tower as set forth in claim 11, wherein is provided means for restricting the entry of cooling air into the air inlet faces of the fill defined by said fill components of at least a portion of the perimeter of the tower to limit the formation of ice on the air inlet faces of the fill components during freezing weather operation of the tower.

14. A rehabilitated, essentially circular, industrial-size crossflow water cooling tower as set forth in claim 13, wherein said cooling air restricting means is positioned to limit entry of cooling air to only the lower portion of the air inlet faces of the fill components.

15. A rehabilitated, essentially circular, industrial-size crossflow water cooling tower as set forth in claim 14, wherein said cooling air restricting means is positioned to limit entry of cooling air to no more than the lower one-third portion of the air inlet faces of the fill components.

16. A rehabilitated, essentially circular, industrial-size crossflow water cooling tower as set forth in claim 11, wherein is provided a series of vertically spaced, horizontally oriented inlet louvers across the air inlet faces of the fill defined by said fill components, at least certain of the lowermost of said inlet louvers receding in a direction toward the interior of the tower to minimize formation of ice on the air inlet faces of the fill components during freezing weather operation of the tower.

* * * * *